(12) United States Patent
Wilsher et al.

(10) Patent No.: US 7,457,006 B2
(45) Date of Patent: Nov. 25, 2008

(54) CALIBRATION SYSTEM FOR A SCANNER FOR RECORDING IMAGES FROM SHEETS

(75) Inventors: Michael John Wilsher, Letchworth (GB); Claire Dawn Ireland, St Neots (GB)

(73) Assignee: Xerox Corporation, Norwalk, CT (US)

( * ) Notice: Subject to any disclaimer, the term of this patent is extended or adjusted under 35 U.S.C. 154(b) by 772 days.

(21) Appl. No.: 11/148,041

(22) Filed: Jun. 8, 2005

(65) Prior Publication Data

US 2006/0279803 A1    Dec. 14, 2006

(51) Int. Cl.
*H04N 1/04* (2006.01)

(52) U.S. Cl. .................. 358/461; 358/496; 358/498; 358/497; 358/408; 358/474; 399/374; 399/364; 399/367; 355/23; 355/24

(58) Field of Classification Search .............. 358/496, 358/498, 497, 401, 501, 505, 408, 406, 504, 358/461; 399/364, 374, 367; 355/23, 24; 382/274

See application file for complete search history.

(56) References Cited

U.S. PATENT DOCUMENTS

| | | | |
|---|---|---|---|
| 4,429,333 A | 1/1984 | Davis et al. | |
| 5,280,368 A | 1/1994 | Fullerton | |
| 6,323,933 B1 * | 11/2001 | Anzai | 355/23 |
| 6,967,749 B2 * | 11/2005 | Chen | 358/406 |

* cited by examiner

*Primary Examiner*—Cheukfan Lee
(74) *Attorney, Agent, or Firm*—R. Hutter

(57) ABSTRACT

An image input scanner having two scan heads for simultaneous scanning of both sides of a sheet includes two calibration surfaces. A first calibration surface is disposed on the carriage on which a first scan head is mounted. A second calibration surface is disposed on the document handler.

7 Claims, 1 Drawing Sheet

CALIBRATION SYSTEM FOR A SCANNER FOR RECORDING IMAGES FROM SHEETS

TECHNICAL FIELD

The present disclosure relates to the scanning of original hard-copy images into electronic form, as would be found, for example, in a digital copier or other scanner.

BACKGROUND

Document handlers are devices that draw individual sheets from a stack of sheets, and sequentially allow the image on each sheet to be recorded, typically by a photoreceptor (in a "light-lens" or analog copier) or by a photosensitive device (in a digital copier, scanner, or facsimile). In a common arrangement, a copier has a conventional main platen, on which single sheets can be manually placed, as well as a smaller platen, typically adjacent the main platen, which is used by the document handler when sheets are being passed therethrough. In a typical design, when a single sheet is being recorded through the main platen, the photosensitive device with associated light source (or "scan head") is moved relative to the platen to record the entire image; when the document handler is being used to expose images through the smaller platen, a photosensitive device is typically left stationary under the smaller platen, and the motion of the sheet caused by the document handler provides the necessary relative motion of each sheet past the photosensitive device.

For recording images on sheets that bear images on both sides thereof, there has typically been two general approaches. For scanners with a single scan head, the general approach is to use the scan head first to scan one side of the sheet, and then mechanically invert and re-feed the sheet so that the other side of the sheet is moved past the scan head. For scanners with two scan heads, each scan head is effectively placed on opposite sides of a paper path, so that both images on both sides of the sheet are recorded. A practical overall architecture for a two-scan-head input scanner can be seen in U.S. Published Patent Application 2004/0080791 A1, now U.S. Pat. No. 7,164,507.

In the practical use of any sophisticated scanning apparatus, it is occasionally desired to "calibrate" the imaging devices therein, i.e., record an image from a calibration surface of predetermined properties, such as reflectivity and color, and use the resulting calibration information in affecting data from subsequently-scanned images. Such calibration surfaces are typically formed on the apparatus itself, in a location where an imaging apparatus can record it, such as shown, for example, in U.S. Pat. Nos. 4,429,333 and 5,280,368.

SUMMARY

According to one aspect, there is provided an apparatus for recording images on sheets. A light-transmissive platen defines a top surface and a bottom surface. A carriage is disposed below the platen and moves parallel to the bottom surface of the platen, the carriage having disposed thereon a first imaging device and a member defining a first calibration surface. A second imaging device is disposed above the platen. A document handler moves an image-bearing sheet in a process direction over the platen for reading by at least one of the first imaging device and the second imaging device. The carriage is movable to cause the second imaging device to read the first calibration surface.

According to another aspect, there is provided a method of calibrating a scanning apparatus, the apparatus having a movable carriage including a first imaging device and a member defining a first calibration surface, and a second imaging device and a member defining a second calibration surface. The carriage moves relative to the second imaging device so that the first imaging device reads the second calibration surface and the second imaging device reads the first calibration surface.

DETAILED DESCRIPTION

Figure 1:
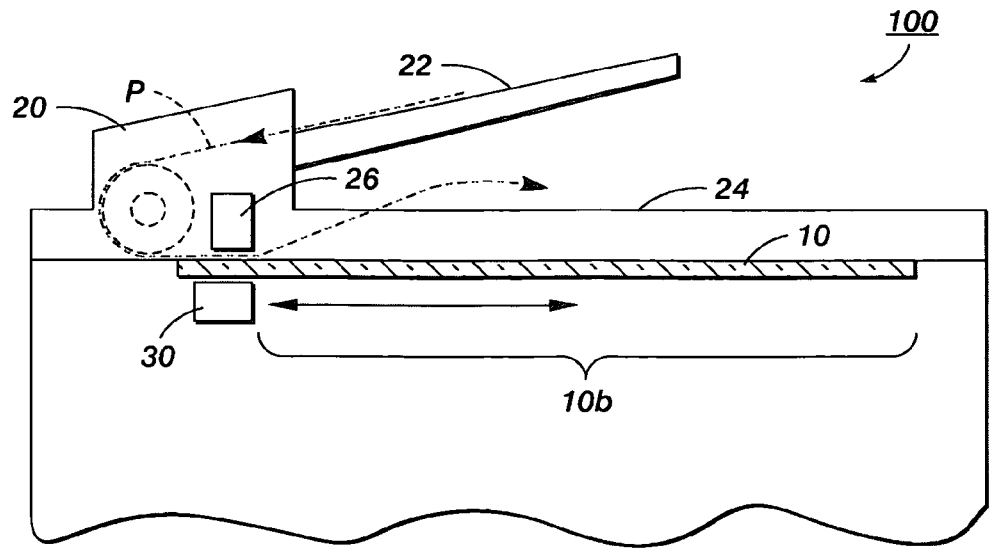
FIG. 1 is a simplified elevational view of a scanner as would be found, for example, as part of a digital copier or digital printing system.

FIG. 1 is a simplified elevational view of a scanner, generally indicated as 100, as would be found, for example, as part of a digital copier or digital printing system. As is familiar in the art, the scanner 100 includes a light-transmissive platen 10, on which a sheet or portion of an image-bearing sheet is placed. Above the platen 10 is a document handler generally indicated as 20; the overall purpose of document handler 20 is draw sheets, one at a time, from a tray 22, and move each sheet through a process direction P to tray 24. (The motion of sheets is performed by various mechanical devices, not shown.) At one point in its motion through the document handler 20, the sheet passes over a portion of platen 10 (or another platen substantially coplanar with platen 10) adjacent a carriage 30. Carriage 30 is disposed on the opposite side of platen 10 as the sheet and remains substantially stationary during scanning by the document handler 20. Associated with carriage 30, as will be described in detail below, is a light source and a photosensitive "imaging device," such as a single CCD chip or a page-width assembly, for recording the thin "slices" of image as the sheet passes over carriage 30.

The scanner shown in FIG. 1 can also be used to record images on sheets or other objects that are placed on the main portion of platen 10. As is familiar in the art of digital copiers, the document handler 20, along with trays 22 and 24, can be lifted upward (by a hinge at the back of the machine, not shown), exposing the bulk 10b of platen 10. Carriage 30 is movable relative to the main portion of platen 10, so that when an image-bearing sheet is placed on the bulk 10b of platen 10, carriage 30 moves relative to the sheet to record the image thereon.

In this embodiment, disposed within the housing of document handler 20 is a second scan head 26, which, as will be explained in detail below, also includes a light source and an imaging device, such as a single CCD chip or a page-width assembly. Second scan head 26 is oriented to record slices of the image on the upward-facing side of a sheet moving through the document handler 20 in direction P as the downward-facing side is recorded by carriage 30. In this way, both sides of a two-sided document are recorded substantially simultaneously.

Figure 2:
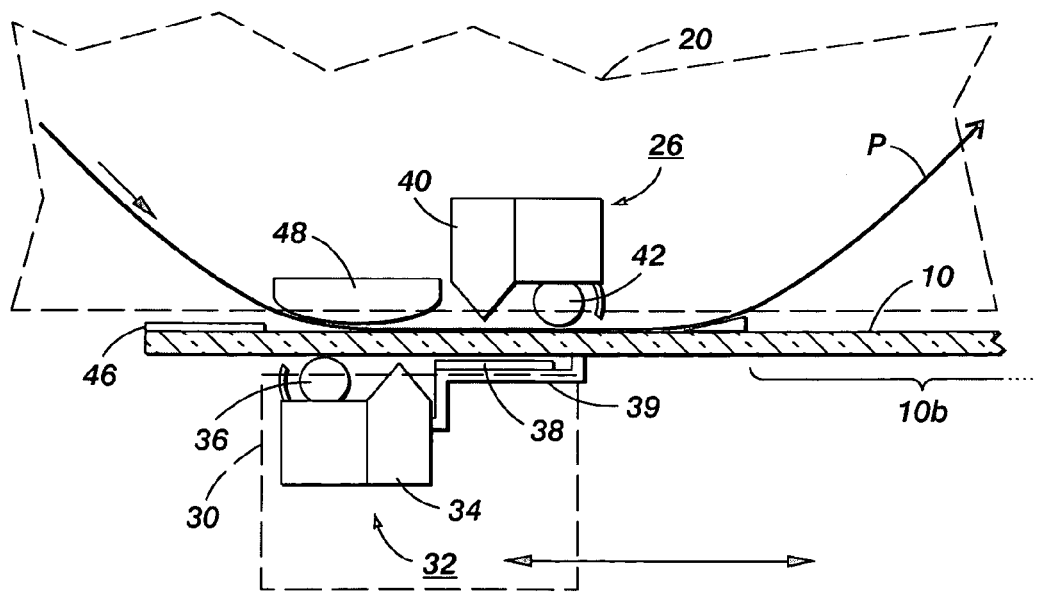
FIG. 2 is a detailed elevational view of the zone near the two scan heads in a scanner having the general configuration of FIG. 1.

In the two-scan-head architecture of FIG. 1, both the scan head in carriage 30 and the second scan head 26 must be occasionally calibrated. FIG. 2 shows a detailed elevational view of the zone near the two scan heads in a scanner having the general configuration of FIG. 1. The carriage 30 includes therein the scan head 32, which includes imaging device 34

(such as in the form of a page-width array of photosensor chips) and light source 36. Second scan head 26, which is disposed within the housing of document handler 20, includes imaging device 40 and light source 42. There may further be provided a backer bar 48, against which a sheet slides as it moves through direction P.

With regard to calibration, there is provided a member defining a calibration surface, in the form of calibration strip 38, which is positioned to be viewed by imaging device 40, and another member defining a calibration surface, in the form of calibration strip 46, which is positioned to be viewed by imaging device 34. Typically the calibration strips extend along the entire functional lengths of the linear photosensor arrays in imaging devices 34 and 40.

As can be seen, calibration strip 38 rides along with the movable carriage 30. Calibration strip 38 can be mounted adjacent a riding surface 39 that contacts and slides against the underside of platen 10; in this way, calibration strip 38 maintains a consistent distance relative to the underside of platen 10 regardless of the motion of carriage 30. Calibration strip 46 can be attached to a portion of the top side of platen 10, or can be attached to the underside of document handler 20. Calibration strip 46 defines a calibration surface downward so it can be read by imaging device 34 when the carriage 30 is suitably positioned.

It will be noticed that the position of carriage 30 in FIG. 2 is such that the imaging device 34 is aimed to read a slice of a sheet passing against backer bar 48. When the carriage 30 is in the position shown in FIG. 2, the imaging device 40 is aimed at calibration strip 38, when there is no sheet passing through process direction P. Calibration strip 38 is disposed on the carriage 30 whereby the calibration strip 38 is adjacent the imaging device 40 when the imaging device 34 is positioned to read an image from a sheet passing through the process direction P. In a calibration mode, however, carriage 30 is moved to the left in the Figure (by a motor and associated mechanism, not shown) so that imaging device 34 is aimed at the calibration strip 46.

In overview, to calibrate both imaging devices 34 and 40, the carriage 30 starts at a position at the extreme left in FIG. 2, where imaging device 34 can read calibration strip 46, and then starts moving to the right, in one continuous motion. In a practical embodiment, it is typical that the calibration occurs while an imaging device is moving relative to its calibration strip, so that a large number of pixel-sized areas on the calibration strip are read over time. As the carriage 30 moves to the right, imaging device 34 stops reading from calibration strip 46 and then calibration strip 38 mounted on carriage 30 comes within range of the stationary imaging device 40, at which point imaging device 40 reads from the calibration strip 38 for calibration. In this embodiment, the calibration of imaging device 40 follows substantially immediately the ending of the calibration of imaging device 34 as carriage 30 moves from left to right.

The arrangement of the present embodiment provides many practical advantages. Both calibration strips are made available to their respective imaging devices without the need for any unusual mechanism: the only mechanical motion for calibration comes from carriage 30, which is used to scan sheets placed on platen 10b anyway. The overall placement of the calibration strips avoids any interference with the paper path along process direction P, so no "stubbing points" are provided: for instance, it can be seen in FIG. 2 that the process direction P passes between the calibration strip 46 and the imaging device 40. Because calibration strip 46 faces downward, and may be attached to platen 10, it is relatively unlikely to have dust settle thereon. Calibration strip 38 is disposed under platen 10 and similarly avoids dust attraction.

The two imaging devices 34 and 40 can be calibrated individually, imaging device 34 calibrating as it moves across calibration strip 46 and imaging device 40 as calibration strip 38 moves beneath. Further, it is possible to design a system to calibrate both imaging devices in one substantially continuous movement of carriage 30, as imaging device 34 passes calibration strip 46, imaging device 40 is also passing over calibration strip 38. Also, contamination detection can be employed on the image data associated with the calibration process, to reject values outside a range and further enhance the contamination avoidance of the system.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An apparatus for recording images on sheets, comprising:
    a light-transmissive platen, defining a top surface and a bottom surface;
    a carriage disposed below the platen and movable parallel to the bottom surface of the platen, the carriage having disposed thereon a first imaging device, and a member defining a first calibration surface;
    a member defining a second calibration surface, disposed adjacent the top surface of the platen;
    a second imaging device disposed above the platen;
    a document handler for moving an image-bearing sheet in a process direction over the platen for reading by at least one of the first imaging device and the second imaging device;
    the carriage being movable to cause the second imaging device to read the first calibration surface; and
    the member defining the first calibration surface and the member defining the second calibration surface being disposed whereby, when the carriage is moving, the first imaging device reads from the second calibration surface, and then the second imaging device reads from the first calibration surface.

2. The apparatus of claim 1, the member defining the first calibration surface being mounted adjacent a riding surface engaging the bottom surface of the platen.

3. The apparatus of claim 1, the member defining a second calibration surface contacting the top surface of the platen.

4. The apparatus of claim 1, the member defining a second calibration surface being attached to the top surface of the platen.

5. The apparatus of claim 1, the process direction passing between the member defining a second calibration surface and the second imaging device.

6. The apparatus of claim 1, the member defining the first calibration surface being disposed on the carriage whereby the first calibration surface is adjacent the second imaging device when the first imaging device is positioned to read an image from a sheet passing through the process direction.

7. The apparatus of claim 1, wherein, when the carriage is moving, the first imaging device reads from the second calibration surface, and then, substantially immediately thereafter, the second imaging device reads from the first calibration surface.

* * * * *